United States Patent
Eibel

[11] Patent Number: 5,854,545
[45] Date of Patent: Dec. 29, 1998

[54] METHOD FOR THE POSITIONING OF AN ACTUATOR

[75] Inventor: Michael Eibel, Rüdesheim, Germany

[73] Assignee: VDO Adolf Schindling AG, Frankfurt, Germany

[21] Appl. No.: 827,154

[22] Filed: Mar. 27, 1997

Related U.S. Application Data

[63] Continuation of Ser. No. 316,935, Oct. 3, 1994, abandoned.

[30]      Foreign Application Priority Data

Oct. 15, 1993 [DE] Germany .................. 43 35 239.1

[51] Int. Cl.⁶ ........................................ H02K 7/10
[52] U.S. Cl. ...................... 318/369; 318/601; 318/626
[58] Field of Search ................... 318/560, 561, 318/562, 569, 567, 362–382, 580, 587, 600, 601, 603, 626

[56]           References Cited

U.S. PATENT DOCUMENTS

| 3,601,588 | 8/1971 | Bristol . |
| 4,258,300 | 3/1981 | Fromont . |
| 4,490,661 | 12/1984 | Brown et al. . |
| 4,816,734 | 3/1989 | Kurakako et al. .................. 318/561 X |
| 5,001,770 | 3/1991 | Losic et al. .............................. 388/811 |

FOREIGN PATENT DOCUMENTS

| 0185945 | 7/1986 | European Pat. Off. . |
| 0464041 | 1/1992 | European Pat. Off. . |
| 3427871 | 2/1985 | Germany . |
| 4221768 | 1/1994 | Germany . |

Primary Examiner—David S. Martin
Attorney, Agent, or Firm—Martin A. Farber

[57]              ABSTRACT

An acknowledgement-free method for the positioning of an actuator by means of an electric motor which is controlled as a function of time by a microprocessor, wherein there are proportionality constants $K_1$, $K_2$ of a formula Adjustment Path=$K$·Adjustment Time as well as the corresponding times $T_1$, $T_2$ for the braking of the rotor, after disconnection of the electric motor, from a first speed of rotation $N_a$ to a second speed of rotation $N_b$. The constant $K_1$ and $K_2$ are the times $T_1$ and $T_2$ are determined and stored for the structural unit consisting of actuator and electric motor at at least two different loads $B_1$, $B_2$. Upon operation of the actuator, the time $T_x$ for the braking of the rotor from $N_a$ to $N_b$ is measured and, with the use of the stored times $T_1$, $T_2$, the proportionality constant $K_x$ corresponding to the time $T_x$ is calculated by linear interpolation and used for the control.

8 Claims, 1 Drawing Sheet

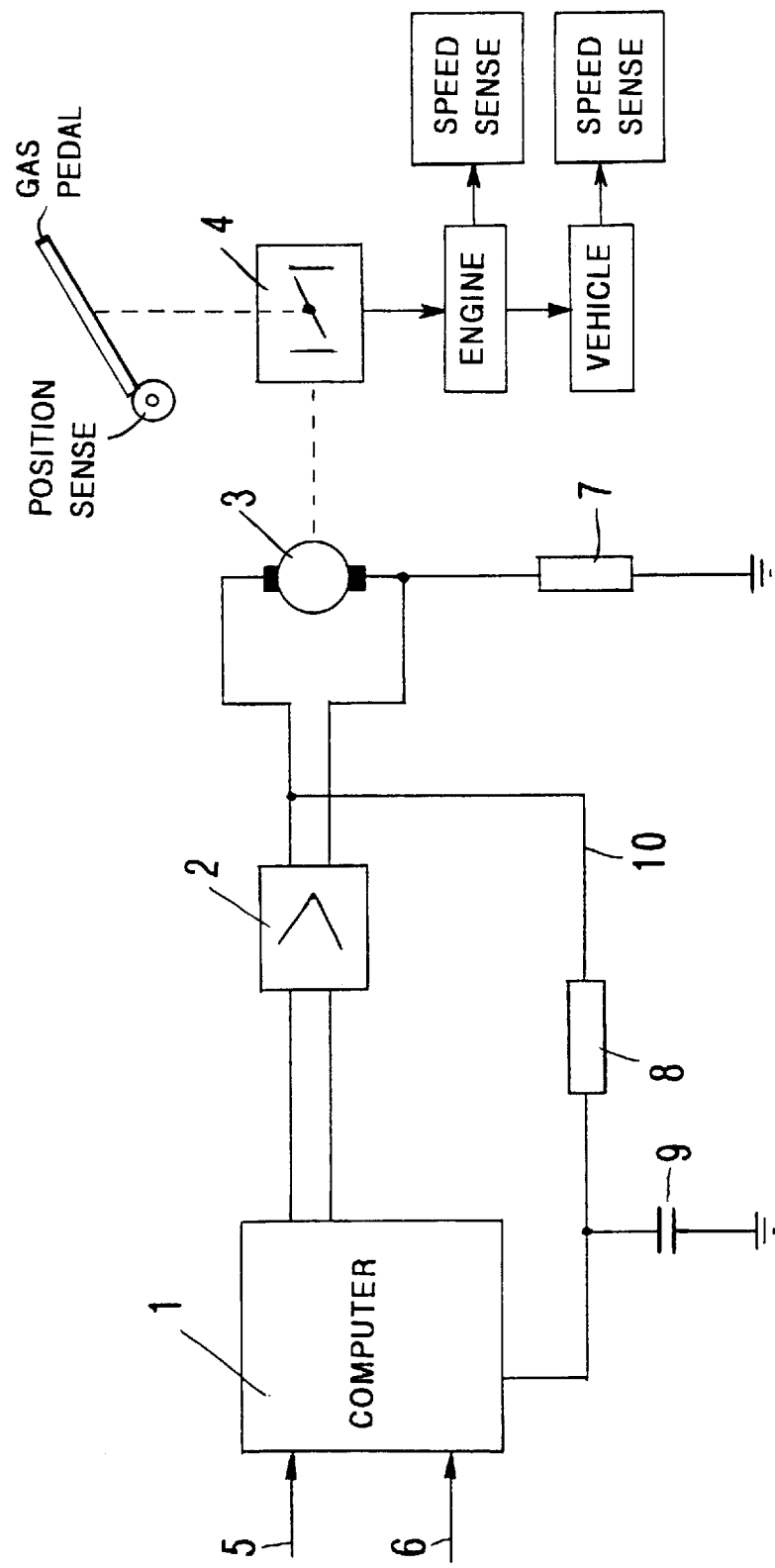

METHOD FOR THE POSITIONING OF AN ACTUATOR

RELATED APPLICATION

This application is a continuation of my application Ser. No. 08/316,935 filed Oct. 3, 1994 now abandoned.

FIELD AND BACKGROUND OF THE INVENTION

The present invention relates to a method for the positioning of an actuator by means of an electric motor which is controlled as a function of time by a microprocessor, the method being implemented without use of a feedback signal giving the actual position of the actuator, which signal may be referred to hereinafter as an acknowledgement. One form of actuator of considerable interest herein is a device for positioning a throttle valve in the carburetor of an internal combustion engine. Movement of the valve may be described in terms of rotating motion about a shaft of the valve, or in terms of linear motion of a point on the rim of the valve along a circular path. In the latter mode of description, movement of the point on the valve rim may be regarded as a displacement along the path. Since this path is descriptive of the displacement, it may be referred to herein as the displacement path. The time of travel of the foregoing point on the valve rim from a first position to a later desired position may be referred to hereinafter as the adjustment time.

Upon the positioning of an actuator by such methods, one generally cannot do without some type of acknowledgement since the proportionality between adjustment path and adjustment time may change for various reasons. Thus, for instance, the frictional resistance in a new device is generally greater after a certain initial period of time so that, with the same adjustment time, a longer adjustment path is traversed after a break-in period than upon the initial placing in operation. As a result of wear, the frictional resistance, however, may also become greater so that later on, a shorter adjustment path may result in to a given adjustment time. Furthermore, the frictional conditions in the case of regular maintenance, may be more favorable than in the case of lengthy use without maintenance. Finally, the operating temperature also affects the relationship of adjustment path to adjustment time so that, without a special acknowledgement system, the end position of the actuator reached with a given adjustment time differs to a greater or lesser extent from the desired position.

The use of an actuator positioning system without a feedback position signal, or "acknowledgement" however, frequently is not considered for reasons of space and/or cost. In such case, the end positions, along the path of actuator displacement generally defined by mechanical stops or the like, are set before or after the actual operating time or during pauses in operation. In this way, the adjustment range or the adjustment time for the entire adjustment range can be determined and correction values for the proportionality between adjustment path and adjustment time are obtained.

Such methods of system alignment are relatively expensive since the entire adjustment range must be passed over at least once. Furthermore, measures must be taken to provide assurance that the end positions of the actuator travel, and not some intermediate positions, are actually determined. For example, if the end positions of the actuator are not determined by use of end switches disposed on the displacement path, but by observation of a significant change in a control variable (for instance, motor current), it is noted that such change in the control variable could also take place upon a jamming of the actuator. In accordance with EP 0 464 041 B1, it has therefore already been proposed that the correction of the value of an end position be effected only when it is established that the actuator is in the region of the end position which is known from prior adjustments.

Furthermore, such methods are only feasible if the actuator has times, sufficiently free of use in order to be able to carry out the adjustment process within the necessary short time intervals.

The positioning of an actuator via the adjustment time which, in principle, is very simple, is therefore only of interest without an acknowledgement system, or an expensive adjustment method, if the necessary recalibration of the relationship between adjustment path and adjustment time can be carried out at clearly less expense.

SUMMARY OF THE INVENTION

Thus, it is an object of the invention to provide a method of this type wherein changes in the proportionality constants between time of actuator travel and distance of actuator travel can be determined and compensated for in the simplest possible manner. It is noted that displacement of the actuator, or of the aforementioned throttle valve driven by the actuator, can be related to the time of travel along the path by the simple well-known equation that x (displacement along the adjustment path) is equal to the product of K (speed) multiplied by t (elapsed time for accomplishing the adjustment in the position of the throttle valve).

According to the invention, and with respect to the operation of a structural unit of an actuator driving a load, (such as the abovementioned valve) there are proportionality constants $K_1$, $K_2$ of a formula $$\text{Adjustment Path} = K \cdot \text{Adjustment Time}$$

wherein x is a speed of travel, as well as corresponding times $T_1$, $T_2$ for a braking of the motor rotor, after deenergization of the electric motor, from a first speed of rotation $N_a$ to a second speed of rotation $N_b$. The times $T_1$ and $T_2$ and the constants $K_1$ and $K_2$ are determined and stored for the structural unit consisting of the actuator and the electric motor at at least two different loads $B_2$. Upon operation of the actuator, the time $T_x$ for a braking of the rotor from $N_a$ to $N_b$ is measured and, with the use of the stored times $T_1$, $T_2$, the proportionality constant $K_x$ corresponding to the time $T_x$ is calculated by linear interpolation and used for the control.

In the terminology employed in this description, the subscripts 1, 2 ... n, wherein n is an integer, designate trials wherein the values of K, T, and B are determined. A value of K or T of B which is intermediate a value $K_n$ or $T_n$ or $B_n$, respectively, is represented respectively, by $K_x$ or $T_x$ or $B_x$.

This aspect of the invention is based on the consideration that the time for a given change in speed of rotation upon the disconnecting of the motor control is inversely proportional to the existing friction and load in the system, and that therefore the braking times can be used for a correction of the proportionality factor. In other words, when friction and/or load increase (decrease), the braking time for a change of the rotor speed from a first value $N_a$ to a second value $N_b$ becomes shorter (longer). Thus, there is the possibility, by means of the previously determined correlation between the proportionality factor K and the braking time as well as the braking time actually determined, of adapting the proportionality factor in a simple manner to the instantaneous condition of operation of the unit consisting of the actuator and the electric motor.

The required determination of the time can be effected directly with the microprocessor present and does not require separate measuring and evaluating elements if the generator voltage V of the electric motor is compared with a threshold value $V_o$.

A feature of the invention is that the proportionality constants $K_1$, $K_2$, $K_3$ and the corresponding braking times $T_1$, $T_2$, $T_3$ are determined and are stored for at least three different loads having values $B_1$, $B_2$, $B_3$.

Another feature of the invention is that, for different loads $B_1, \ldots B_n$, pairs of values $K_1, T_1 \ldots K_n, T_n$ are determined and stored as a table. Also, for the control there is used the K value, the T value and corresponding to, which is closest to, the existing braking time $T_x$.

Still another feature of the invention is that the existing K value is determined by linear interpolation between the table values.

Also the invention provides for the forming from the values $K_1 \ldots K_n$ of a replacement function $$K=f(T)$$

and the existing proportionality constant $K_x$ is determined by an inserting of the existing braking time $T_x$ in the formula.

Still a further feature of the invention is that, as first speed of rotation $N_a$, there is used the speed of rotation reached by the rotor when the electric motor is passed through by current in the same direction for at least the duration of its run-up time.

Furthermore, as second speed of rotation $N_b$ there is used the speed of rotation with motor disconnected, at which the generator voltage V of the electric motor drops below a predetermined threshold value $V_o$.

Yet another feature comprises the fact that for a construction series of actuators, the average values $K_{1M}$ and $T_{1M} \ldots K_{nM}$, $T_{nM}$ are determined and stored in a microprocessor of each individual actuator.

BRIEF DESCRIPTION OF THE DRAWING

With the above and other objects and advantages in view, the present invention will become more clearly understood in connection with the detailed description of a preferred embodiment, when considered with the accompanying drawing, wherein the sole FIGURE illustrates the circuit according to the invention.

DETAILED DESCRIPTION OF THE PREFERRED EMBODIMENT

For the positioning of an actuator, such as for instance a throttle valve 4 in the intake pipe of an internal-combustion engine, an electric motor 3 which is controlled by a microprocessor or computer 1 via an output stage 2 is generally used. Via the inputs 5 and 6, there are fed to the microprocessor the desired value and the existing value of a control variable, which may be the speed of rotation of the internal combustion engine, the speed of a vehicle driven by the internal combustion engine, or the position of the throttle valve the desired position of which is determined by the gas pedal.

For the carrying out of the method of the invention, the above-described circuit must furthermore be supplemented by a resistor 7, so that a current can flow with a high-ohmic, i.e. open, output stage 2 and the necessary measurements can be carried out over the line 10. Within the line 10, there is furthermore provided an RC filter 8, 9 in order to smooth out the ripples of the generator voltage caused by the pole sensitivity of the motor. Only a digital input on the microprocessor 1, which is already present, is required for the measurement. The signal conveyed by line 10 to the computer 1 is representative of engine speed so as to enable the computer 1 to calculate the aforementioned braking times, this giving rise to the aforementioned values of T and K.

I claim:

1. A method for the positioning, without acknowledgment, of an actuator by a rotor of an electric motor, the motor being controlled as a function of time by a microprocessor, comprising the steps of:

determining a value $K_1$ of a proportionality constant K and a corresponding value $T_1$ of an adjustment time T during a braking of the rotor under a value $B_1$ of a load B from a first speed of rotation $N_a$ to a second speed of rotation $N_b$ upon deenergization of the electric motor, for use in a formula $$\text{adjustment path}=(K)(T):$$

storing the values $K_1$, $T_1$, $B_1$, $N_a$ and $N_b$;

repeating said steps of determining and storing for additional corresponding $K_2 \ldots K_n$, $T_2 \ldots T_n$ and $B_2 \ldots B_n$ for the braking from speed $N_a$ to speed $N_b$;

measuring a time $T_x$ for braking the rotor from the speed $N_a$ to the speed $N_b$ upon operation of the actuator to obtain a measured value of time $T_x$;

interpolating by linear interpolation between two stored values of time $T_n$ and $T_{n+1}$ to obtain a value of the constant $K_x$ corresponding to the measured value of time $T_x$; and positioning the actuator with a braking of the rotor through an adjustment path equal to the product of $K_x$ and $T_x$.

2. A method according to claim 1, wherein the proportionality constant K has values $K_1$, $K_2$, $K_3$ and the corresponding braking times have values $T_1$, $T_2$, $T_3$ and wherein the values $K_1$, $T_1$ and $K_2$, $T_2$, and $K_3$, $T_3$ are determined and are stored for at least three different loads having values $B_1$, $B_2$ and $B_3$, respectively.

3. A method according to claim 1, wherein, in said steps of determining and storing for different load values $B_1, \ldots B_n$, pairs of values $K_1, T_1 \ldots K_n, T_n$ are determined and stored as a table, and wherein, for the control, there are used the K value and the T value corresponding to the closest values of the present braking time $T_x$.

4. A method according to claim 3, further comprising a step of determining existing K value by linear interpolation between the table values.

5. A method according to claim 3, further comprising a step of forming the values $K_1 \ldots K_n$ of a replacement function $$K=f(T)$$

and determining the present proportionality constant $K_x$ by inserting the present braking time $T_x$ in the replacement function.

6. A method according to claim 1, wherein as first speed of rotation $N_a$, there is used the speed of rotation reached by the rotor when the electric motor is passed through by current in the same direction for at least the duration of its run-up time.

7. A method according to claim 6, wherein as second speed of rotation $N_b$ there is used the speed of rotation with motor deenergized, at which a generator voltage V of the electric motor drops below a predetermined threshold value $V_o$.

8. A method according to claim 1, wherein for a plurality of different actuators, identified respectively by integrals of an integer M, and having respective microprocessors associated therewith, there are additional steps of determining and storing average values $K_{1M}$, $T_{1M}$ ... $K_{nM}$, $T_{nM}$ within the microprocessor of each individual actuator.

* * * * *